July 19, 1938.    A. W. WENZEL    2,124,094
PACKING RING
Filed Sept. 18, 1934    3 Sheets-Sheet 1

INVENTOR
Albert W. Wenzel
BY
Howard P. King
ATTORNEY

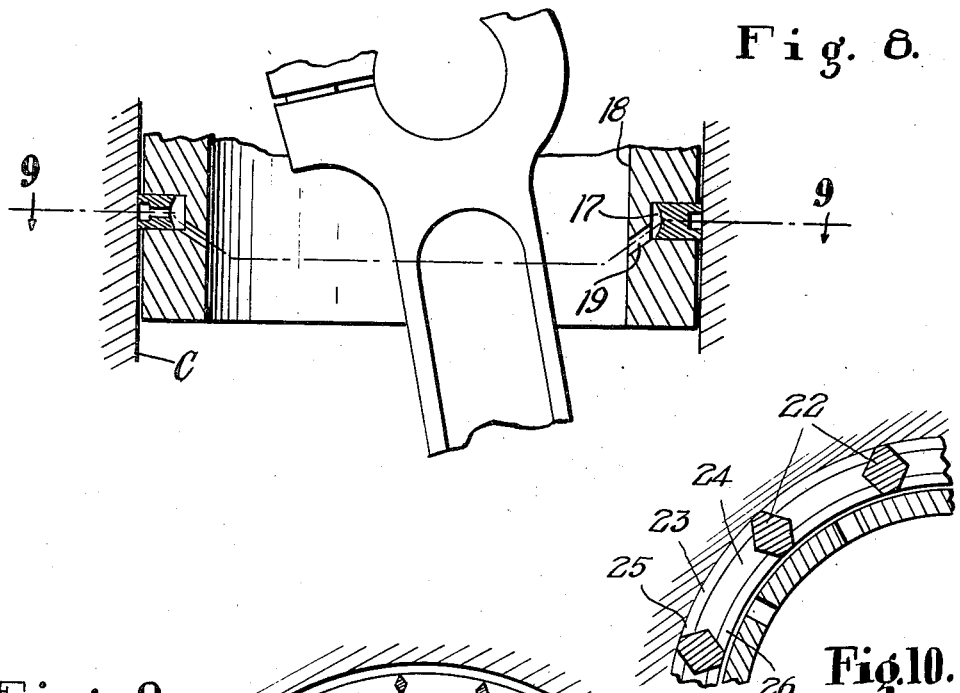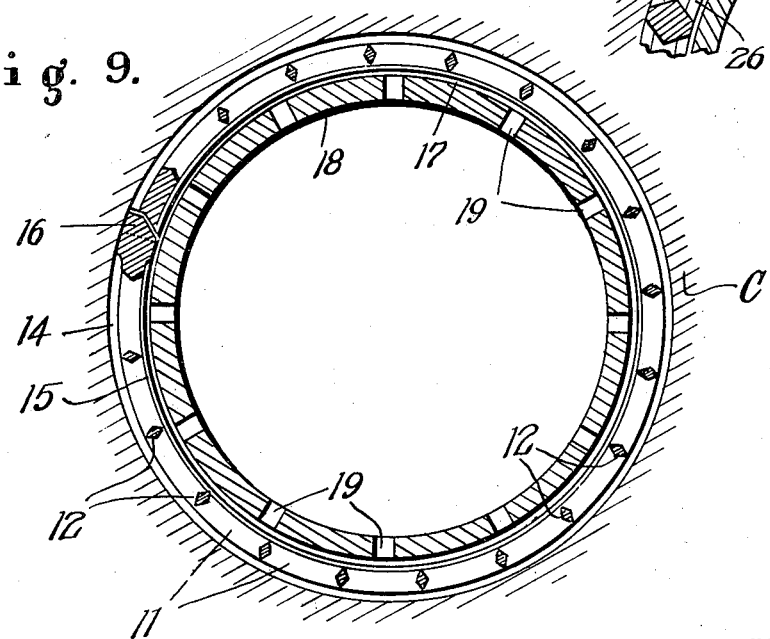

July 19, 1938. A. W. WENZEL 2,124,094
PACKING RING
Filed Sept. 18, 1934    3 Sheets-Sheet 3

INVENTOR
Albert W. Wenzel
BY Howard P. King
ATTORNEY

Patented July 19, 1938

2,124,094

UNITED STATES PATENT OFFICE 2,124,094

PACKING RING

Albert W. Wenzel, Irvington, N. J.

Application September 18, 1934, Serial No. 744,511

3 Claims. (Cl. 309—45)

This invention relates to packing rings, and more particularly to packing rings of the type generally referred to as oil-rings.

The objects of the invention are to obtain maximum oil-passage space within a ring; to provide for adequate strength for the ring; to allow for movement of the oil circumferentially of the ring; to close passage to outer circumferential movement of the oil at the ring split or joint; to take advantage of surface tension of the oil and provide means for maintaining a connected body of oil with the oil in all of the slots; to enable the suction occurring at the inside of the piston to obtain a flow of oil inwardly through the several slots of the ring; to utilize the passage closing means for the additional function of interlocking the ends of the ring at the split and obtain a lateral seal to passage of cylinder gases in use; to cut the oil slots both from the outside and inside circumferences of the ring; to secure simplicity of construction and operation; and to obtain other advantages and results as may be brought out in the following description.

Referring to the accompanying drawings in which like numerals of reference indicate similar parts throughout the several views;

Figure 8 is a sectional view of a piston in which one of my improved packing rings is mounted, the piston being shown in position within a cylinder and all the parts shown in section;

Figure 9 is a cross-section on line 9—9 of Fig. 8;

Figure 10 is a sectional view similar to Fig. 9, showing the partitions extending to the circumferences of the ring;

Figure 1:
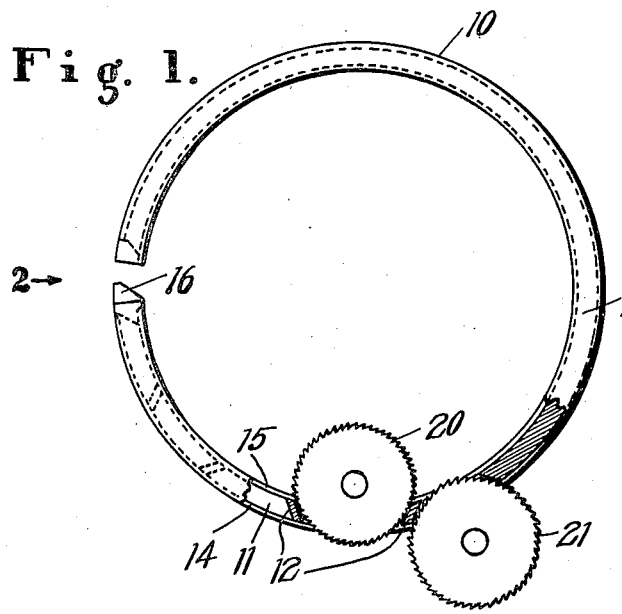
Figure 1 illustrates a packing ring in the process of having slots cut therein.

In the specific embodiment of the invention illustrated in said drawings, the reference numeral 10 indicates the ring in general which is preferably of cast iron and which when completed, provides a plurality of slots 11 opening through the ring and each slot being separated from the next by a partition 12 of metal preferably integral with the side walls 13, 13 of the ring and slots. In manufacture of the rings according to the present invention, the outer and inner circumferences are each provided with depressions or grooves, the outer one, 14, of which is shown as substantially rectangular in cross-section while the inner one, 15, is shown as curvilinear or concave. The slots 11 preferably open into the bottoms of both of these grooves.

The ring, as customary with metallic packing rings, is split, thereby providing ends, and the ring is treated or otherwise constructed to have resiliency, which in this instance tends to normally separate said ends. One end is shown as having a tongue 16 thereon preferably of size, shape and location to project into and substantially fit within the outer groove 14 at the portion thereof next the opposite end. The groove 14 may be made deeper at its end, if so desired, for receiving a tongue 16 of suitable dimensions to have adequate strength. The tongued end of the ring is of full diameter entirely across the same, thereby practically closing the outer groove 14 thereat. With the tongue formed at the outer circumference, said tongue, projecting into the other end of the groove in use closes that end also.

An essential feature of the present invention comprises the provision of a relatively thin partition 12 dividing the several slots 11. Preferably these partitions are each substantially no greater in thickness than the width of the slots. It may be stated at this time that the slots are preferably relatively short which enables the same to be quite wide so that the body of the ring at the sides thereof may be comparatively thin. The partitions act as braces to hold the body portions of the ring at a definite and true width in use. By making slots too long, the body portions at the side of the slot can squeeze together, but according to my construction, the body portions cannot squeeze together under normal conditions because the slots are short and the partitions adequate and in sufficient number to hold the ring in true form.

I furthermore wish to emphasize that the partitions which I provide between the slots have their ends at the outer circumference of the ring substantially the same as the ends of the partition at the inner circumference of the ring. Again, it is to be noted that the outer groove in the ring permits passage of the oil therein so that all circumferential points of a cylinder C will be lubricated. It is a feature of an oil ring to also discharge excess oil back through the piston, and in Figures 8 and 9 I have shown an oil ring of the present invention within a ring-receiving groove 17 of a piston 18. The ring-receiving groove 17 is connected by outlets 19 with the inside of the piston. The inner groove 15 of the ring, shown formed by virtue of the concave shape of the inside circumference of the ring, provides a space wherein oil may always be present even though the ring may be, at any spot, pressed against the bottom of the ring-receiving groove. The oil in any two adjacent slots will therefore always be connected by oil within the inner groove of the ring and the surface tension of the body of oil thus formed will always be maintained by virtue of the inner groove. This avoids presence of air pockets and maintains a constant movement or flow of the excess oil. It is recognized that there is a suction created within the engine base and therefore within the piston during operation of an internal combustion engine. By maintaining the body of oil intact by virtue of its own surface tension, the suction within the piston once establishing a flow of oil through the outlets 19 continues to exert its influence to maintain that flow of oil and consequently there will be a continuous flow of oil wiped from the cylinder surface through slots 11 into groove 15, ring-receiving groove 17 and outlets 19. This flow of oil carries off the carbon deposits entering slots 11 before the deposit has opportunity to accumulate, harden and fill the slot as occurs commonly with rings of the prior art.

Figure 2:
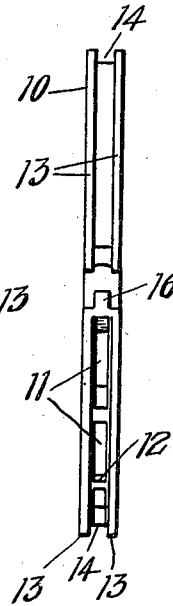
Figure 2 is an edge view thereof looking toward the split of the ring as indicated by arrow 2 in Fig. 1.
Figure 3:
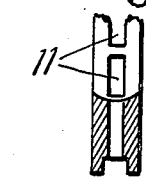
Figure 3 is a sectional view of the ring taken on line 3—3 of Fig. 1 and upon somewhat increased scale thereover.

Broadly, the method involved in manufacture of the improved ring of the present invention, consists in forming the slots by applying cutters 20 and 21 at the inside and outside of the ring respectively. More specifically, the method illustrated in Figures 1 and 2, is utilization of inner and outer cutters 20 and 21 to cut slots 11 from the inside and outside respectively. The cutters are so proportioned and arranged in relation to the ring as to have the tangents at the part of the cutters engaging the partition as the cuts are completed, substantially parallel. The partition consequently has its opposed sides substantially parallel and the partition can thus be made quite thin thereby giving minimum obstruction between the slots. To obtain parallelism of opposite sides of the partitions, the cutter 20 used at the inner circumference of the ring is preferably smaller in diameter than the cutter 21 used at the outside circumference of the ring.

Figure 5:
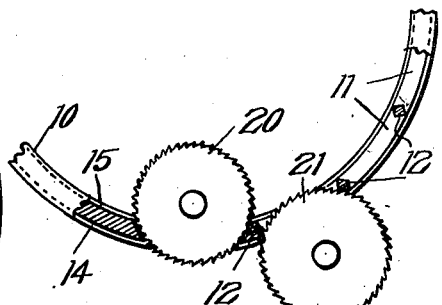
Figure 5 is another similar elevation to Fig. 1 showing a modified method of forming slots.

The foregoing description is to be understood as permitting the utilization of the cutters 20 and 21 either in alternate slots, as shown in Figure 1, or alternately in successive slots as shown in Figure 5. Furthermore, it is to be understood I do not confine myself to simultaneous operation of both cutters, as it is within the scope of the invention to first complete all of one cut or one series of cuts before using the other cutter, and reference in the appended claims to parallelism of tangents of the cutters is not to be construed as requiring continued or simultaneous presence of the cutters. Furthermore, combinations of use of cutters from opposite circumferential sides of the ring, some cuts being to create the slots and other cuts being in slots already formed in part, either wholly as indicated by Figure 1 or 5, or partially according to one figure and partially according to the other, are to be deemed within the scope of the invention.

Figure 6:
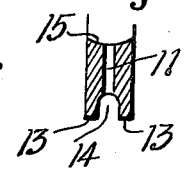
Figure 6 is a sectional view similar to Fig. 3 showing the outer groove as being rounded or concave.

In Figure 6, I have indicated that the formation of the outer groove 14 does not necessarily have to be rectangular in cross-section. It may, if desired, be also concave like the inner groove and may be a compromise between the full-width concave shape of the inner groove and the squared cross-section of the previously described outer groove, one such compromise being shown in Figure 6 wherein the outer corners of the groove 14 may be substantially as heretofore shown and described whereas the bottom of the groove is shown concave.

Figure 7:
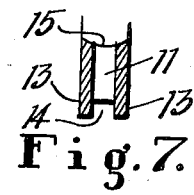
Figure 7 is a sectional view similar to Figures 3 and 6 wherein the slots are cut to the same width as the outer groove.
Figure 4:
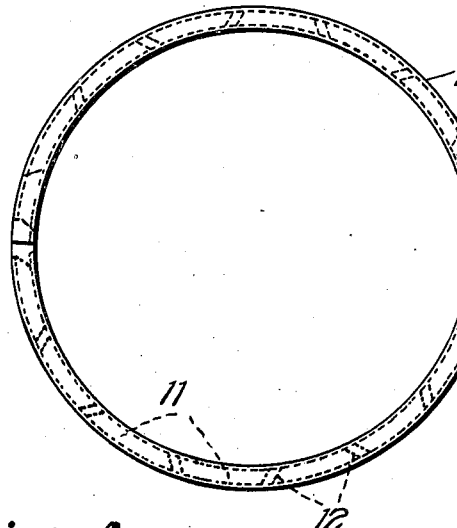
Figure 4 is an elevation similar to Fig. 1 and showing the completed ring with the same closed as occurs in use.

It furthermore is to be understood that the grooves and the slots may be of the same width, if preferred, and in Figure 7 I have shown such a construction. Without making further illustration of combinations of the shapes and dimensions of the several grooves and slots, I wish it understood that I expressly contemplate utilization of other combinations of the illustrated groove shapes and slot dimensions utilizing the disclosure of one figure herein in association with the disclosure of another figure.

I have referred herein to the slots being relatively short in length compared to the width thereof. By this expression of a short slot, I consider the relationship to be such that the length of the slot is no more than sixty times its width, and preferably is not even that long. The width of the partition in a direction from one slot to the next is likewise preferably of substantially no greater dimension than the width of the slot measured in a direction parallel to the axis of the ring.

I wish to be further understood that I deem it within the scope of the present invention to have the partitions between the ends of the slots extending as far out as the outer and inner circumferences of the ring, with the ring otherwise formed as illustrated in the views already discussed, that is, with or without circumferential grooves except that the groove, if provided, are interrupted by the presence of the several partitions. Such a structure is shown in Figure 10 wherein are illustrated a plurality of partitions 22 the outer and inner ends of which are shown as coincident with the outer and inner circumferences of the ring 23. Between the partitions is indicated a slot 24 and next the outer and inner circumferences extending from one partition to the next are shown grooves 25 and 26.

Figure 11:
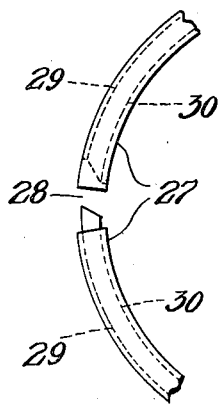
Figures 11 and 12 are face views of modified ring structures showing the portion thereof next the split and illustrating both inner and outer grooves extending to the split in the one view and terminating short of the split in the other view.

While in the preceding discussion and illustrations I have shown one end of the grooves as opening at the split of the ring and the other end thereof closed, I wish it understood that both ends of the grooves may be opened at the split of the ring, or both ends of the grooves may be closed. For illustrative purposes I have shown a ring 27 in Figure 11 having a split 28 and having outer and inner grooves 29 and 30 respectively which are shown as extending to and opening at the split 28.

Figure 12:
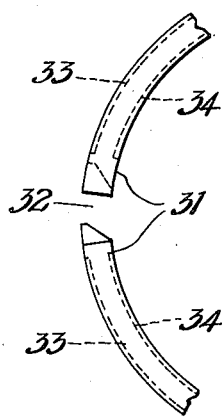

In Figure 12 I have shown a ring 31 having a split 32 and having outer and inner grooves 33 and 34 respectively. It will be noted in this figure that the grooves both terminate before reaching the split 32 and therefore oil within the grooves will be prevented from passing out into the opening provided by the split.

Figure 13:
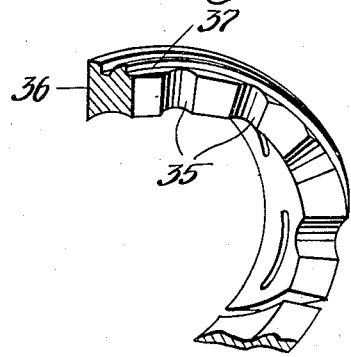
Figure 13 is a perspective view of a portion of a ring having oil passages in the side face thereof.

In Figure 13, I have illustrated oil passages 35 in a side face of a ring 36. These oil passages are formed as concave depressions having continuously curved walls defining a portion of a cylindrical surface developed about an axis parallel to a radius. An important feature of this construction is the fact that these oil passages are both relatively shallow and upon curvilinear lines throughout their length for definite beneficial purposes. By the structure specified, there are no sharp concave corners from which crevices or cracks may start to cause breakage of the ring, and there are no corners within which carbon may begin to collect and gradually build up to completely fill the passage. On the outer circumference of the ring I provide circumferential shoulder 37 facing toward the passages, the shoulder serving to wipe oil from the cylinder and the passages providing means for conveying the oil, as wiped, from the outer circumference of the ring to the inner circumference thereof and enable the oil to discharge through usual openings in the piston.

Figure 14:
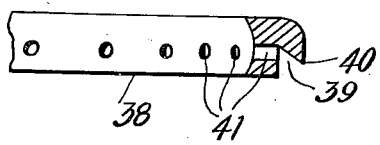
Figure 14 is a sectional view on a diametric-axial plane of a ring having an outer groove opening also toward the side face of the ring.

In Figure 14, I have shown a ring 38 wherein the outer groove 39 is undercut, that is, opens both radially and toward one side of the ring. There is consequently provided a sharp outer edge 40 which will serve to wipe the oil from the cylinder and as it is wiped it will fill groove 39 and be carried from the groove through suitable passages 41 to the interior circumference of the ring and be there discharged. Passages 41 in this instance are shown as round holes, but I deem it within the scope of the invention to utilize any suitable passage, such as the slots or passages heretofore described.

Figure 15:
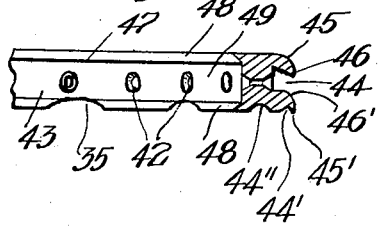
Figure 15 is a similar sectional view of a further modified structure of ring.
Figure 16:
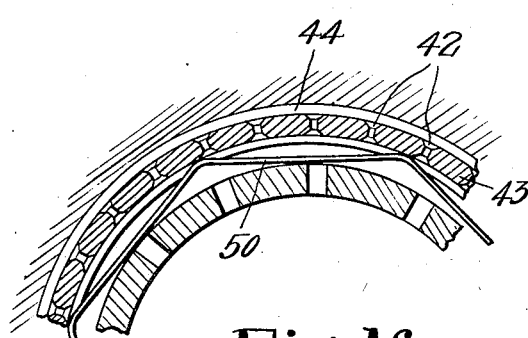
Figure 16 is a central sectional view of the ring of Fig. 15 on a diametric plane, showing the ring, with an expander, mounted in a piston and cylinder.
Figure 18:
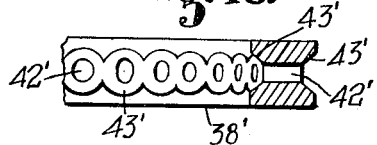
Figure 18 is a view similar to Figures 14 and 15 showing the groove formation from overlapping countersunk passages.

In Figures 15 and 16 I have shown holes or passages 42 in a ring 43 as being countersunk. The countersinking may be provided in the structure shown in Figure 14 and at either or both ends of the holes. In Figures 15 and 16 for illustrative purposes I have shown the holes countersunk at both ends. I have also shown in Figures 15 and 16 the ring somewhat modified from that shown in Figure 14 in that the outer groove 44 while undercut at one side, opens radially but not toward the side face of the ring. The outer corner of the ring nearest the undercut side of the groove is rounded, as at 45, so that it will slide over the oil. The undercut side of the groove provides a sharp corner 46 next the periphery of the ring which will wipe the oil allowed to pass thereto and the oil thus wiped will find an escape through the countersunk holes 42. The other outer edge of the groove may be rounded, as at 46', to pass the oil. I further wish to emphasize that while I have shown in Figures 15 and 16 outer and inner grooves, it is within the scope of this invention to combine the countersinking and the groove, that is to say, the passages 42 may be spaced with sufficient closeness and the countersinking may be of sufficient flare so that the countersinking for one hole will overlap the countersinking of the next hole and thereby provide a suitable connection therebetween or a continuous groove around the ring as in Figure 18. If desired, as shown in Figure 15, the corner edge of the ring opposite from the rounded edge may be undercut as at 45' by a circumferential groove 44' at the side face of the ring. Another circumferential groove 44'' between the outer and inner peripheries of the side face or faces may be provided for retention of oil if desired.

In Figures 15 and 16, I have shown the inner groove 47 as having sloping sidewalls 48 and in cross-section a substantially straight bottom wall 49. The expander 50 very frequently used within piston rings is shown in Figure 16 partially within the groove and partially against the bottom of the ring receiving groove of the piston as usual. The expander may preferably be only as wide as the flat cross portion 49 of the groove so as to seat within the groove.

Figure 17:
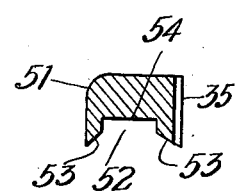
Fig. 17 is a cross-sectional view of a further modified construction of ring having side oil passages and an expander-seating groove such that the expander will not interrupt the flow of oil.

I may combine the use of a seating groove for the expander as shown in Figures 15 and 16 with the use of side face passages for the oil as shown in Figure 13. Such a combined structure is shown in Figure 17 wherein the ring 51 has an inner groove 52 with the sloping edge walls 53 for guiding the expander into a deeper cut portion 54 of the groove where it will positively seat. One side face of the ring is provided with concave curvilinear passages 35 as heretofore described. In the particular ring illustrated in this figure, the edge formed by the intersection of the outer circumference with the side face of the ring containing passages 35 constitutes the scraping edge for collection of oil from the cylinder surface. The opposite edge of the outer circumference may be rounded, if desired, for enabling the ring to pass over the oil and not scrape it when the ring is moving in that direction.

Having thus described my invention, I claim:—

1. A packing ring having a series of slots therethrough in a radial direction, said slots having partitions dividing the same from each other, successive partitions sloping in opposite directions with respect to the circumference.

2. A split packing ring having ends at the split, and having a circumferential groove, said groove terminating short of one end and that end having a tongue, said groove extending to the other end of the ring and said tongue adapted to enter the groove at said other end and close the same in use.

3. A split packing ring having an outer peripheral groove wherein the groove extends to one end of the ring at the split and said ring at that end having a mortise directed laterally from the groove in continuation thereof; said groove terminating at its other end at a distance from the split of the ring, that end of the ring having a tongue and said tongue entering the groove and mortise at the opposite side of the split for closing the groove in use.

ALBERT W. WENZEL.